(12) United States Patent
Huang

(10) Patent No.: US 8,590,205 B2
(45) Date of Patent: Nov. 26, 2013

(54) EXCHANGEABLE HANDLE FOR USE WITH A FISHING POLE

(76) Inventor: Ben Huang, Huntington Beach, CA (US)

(*) Notice: Subject to any disclaimer, the term of this patent is extended or adjusted under 35 U.S.C. 154(b) by 278 days.

(21) Appl. No.: 12/948,637

(22) Filed: Nov. 17, 2010

(65) Prior Publication Data

US 2011/0113673 A1 May 19, 2011

Related U.S. Application Data

(60) Provisional application No. 61/262,511, filed on Nov. 18, 2009.

(51) Int. Cl.
*A01K 87/00* (2006.01)
*A01K 87/08* (2006.01)

(52) U.S. Cl.
USPC .............................................. 43/23; 43/18.1 R

(58) Field of Classification Search
USPC ...... 43/18.1 R, 18.1 CT, 22, 23, 25; 473/303; 16/429

See application file for complete search history.

(56) References Cited

U.S. PATENT DOCUMENTS

| | | | |
|---|---|---|---|
| 450,906 A * | 4/1891 | Blakely | 74/551.9 |
| 979,266 A | 12/1910 | Dean | |
| 1,480,056 A | 1/1924 | Flint | |
| 1,701,856 A | 2/1929 | Kraeuter | |
| 2,010,627 A * | 8/1935 | Dileo | 43/22 |
| 2,115,119 A | 4/1938 | Park | |
| 2,830,399 A * | 4/1958 | Davis | 43/23 |
| 3,073,055 A | 1/1963 | Edwards et al. | |
| 3,150,460 A * | 9/1964 | Dees | 43/4 |
| 3,252,706 A | 5/1966 | Rosasco, Sr. | |
| 3,368,811 A | 2/1968 | Finney | |
| 3,876,320 A | 4/1975 | Phillipson | |
| 3,973,348 A | 8/1976 | Shell | |
| 4,373,718 A | 2/1983 | Schmidt | |
| 4,453,332 A | 6/1984 | Wightman | |
| 4,524,484 A * | 6/1985 | Graham | 16/429 |
| 4,582,459 A | 4/1986 | Benit | |
| 5,220,707 A * | 6/1993 | Newman et al. | 16/429 |
| 5,396,727 A | 3/1995 | Furuya et al. | |
| 5,535,539 A * | 7/1996 | Vetre | 43/23 |

(Continued)

FOREIGN PATENT DOCUMENTS

| | | |
|---|---|---|
| CN | 2090283 | 12/1991 |
| CN | 2596752 Y | 1/2004 |

(Continued)

OTHER PUBLICATIONS

U.S. Appl. No. 12/848,052, filed Jul. 30, 2010, pending.

(Continued)

*Primary Examiner* — David Parsley
*Assistant Examiner* — Danielle Clerkley
(74) *Attorney, Agent, or Firm* — Knobbe Martens Olson & Bear LLP

(57) ABSTRACT

The disclosure provides for handles configured to selectively engage with an article and methods for using such handles. Some of the handles are configured for use with a fishing pole and include a connector configured to couple to a portion of a fishing pole. The handle may include a multiple layers and can be selectively removed from the article. Methods are also provided for selectively coupling exchangeable handles to articles including fishing poles.

12 Claims, 4 Drawing Sheets

(56) References Cited

U.S. PATENT DOCUMENTS

| | | | |
|---|---|---|---|
| 5,537,773 A | 7/1996 | Matsubara et al. | |
| 5,577,722 A | 11/1996 | Glassberg | |
| 5,743,577 A * | 4/1998 | Newman et al. | 294/210 |
| 5,890,313 A * | 4/1999 | Collins | 43/20 |
| 6,148,482 A | 11/2000 | Maraman, Jr. | |
| 6,314,617 B1 | 11/2001 | Hastings | |
| 6,360,475 B1 | 3/2002 | Lepage et al. | |
| 6,629,382 B2 | 10/2003 | Irrgang et al. | |
| 6,733,401 B1 | 5/2004 | Huang | |
| 6,843,732 B1 | 1/2005 | Huang | |
| 6,857,971 B2 | 2/2005 | Huang | |
| 6,973,750 B1 | 12/2005 | Kim | |
| 7,025,690 B2 | 4/2006 | Nam | |
| 7,137,904 B2 | 11/2006 | Huang | |
| 7,186,189 B2 | 3/2007 | Huang | |
| 7,195,568 B2 | 3/2007 | Huang | |
| 7,344,448 B2 | 3/2008 | Huang | |
| 7,347,792 B2 | 3/2008 | Huang | |
| 7,374,498 B2 | 5/2008 | Huang | |
| 7,404,770 B2 | 7/2008 | Huang | |
| 7,438,646 B2 | 10/2008 | Huang | |
| 7,448,957 B2 | 11/2008 | Huang | |
| 7,448,958 B2 | 11/2008 | Huang | |
| 7,470,199 B2 | 12/2008 | Huang | |
| 7,491,133 B2 | 2/2009 | Huang | |
| 7,527,564 B2 | 5/2009 | Huang | |
| 7,566,375 B2 | 7/2009 | Huang | |
| 7,585,230 B2 | 9/2009 | Huang | |
| 7,770,321 B2 | 8/2010 | Huang | |
| 7,862,445 B2 | 1/2011 | Huang | |
| 7,862,446 B2 | 1/2011 | Huang | |
| 7,980,961 B2 | 7/2011 | Huang | |
| 7,985,314 B2 | 7/2011 | Huang | |
| 8,003,171 B2 | 8/2011 | Huang | |
| 2001/0046905 A1 | 11/2001 | Huang | |
| 2004/0248664 A1 | 12/2004 | Billings | |
| 2004/0266546 A1 | 12/2004 | Huang | |
| 2005/0148401 A1 | 7/2005 | Huang | |
| 2006/0264268 A1 | 11/2006 | Huang | |
| 2008/0039226 A1 | 2/2008 | Chi | |
| 2008/0172839 A1 | 7/2008 | Wang | |
| 2009/0258721 A1 | 10/2009 | Huang | |
| 2009/0258722 A1 | 10/2009 | Huang | |
| 2010/0022322 A1 | 1/2010 | Huang | |
| 2010/0260987 A1 | 10/2010 | Huang | |
| 2010/0269626 A1 | 10/2010 | Huang | |
| 2010/0273568 A1 | 10/2010 | Huang | |
| 2010/0281754 A1 | 11/2010 | Huang | |
| 2011/0053704 A1 | 3/2011 | Huang | |
| 2011/0065524 A1 | 3/2011 | Huang | |
| 2011/0077100 A1 | 3/2011 | Huang | |

FOREIGN PATENT DOCUMENTS

| | | |
|---|---|---|
| GB | 2 192 550 A | 1/1988 |
| JP | 53-12061 | 2/1978 |
| JP | 60-61067 | 4/1985 |
| JP | 3076015 | 12/2000 |
| JP | 2001-269088 | 10/2001 |

OTHER PUBLICATIONS

U.S. Appl. No. 13/208,297, filed Aug. 11, 2011, pending.
A. Zosel, Adhession and tack of polymers: Influence of mechanical properties and surface tension, Colloid & Polymer Science 263:541-553 (1985) in 13 pages.
U.S. Appl. No. 13/403764, filed Feb. 23, 2012, pending.
Design U.S. Appl. No. 29/416672, filed Mar. 26, 2012, pending.
U.S. Appl. No. 13/526323, filed Jun. 18, 2012, pending.
Design U.S. Appl. No. 29/436610, filed Nov. 7, 2012, pending.
U.S. Appl. No. 13/750853, filed Jan. 25, 2013, pending.
U.S. Appl. No. 13/866911, filed Apr. 19, 2013, pending.
U.S. Appl. No. 13/874889, filed May 1, 2013, pending.

* cited by examiner

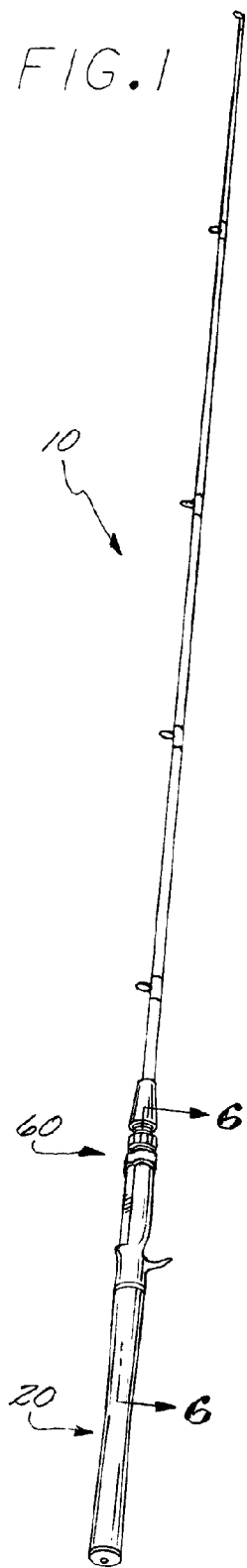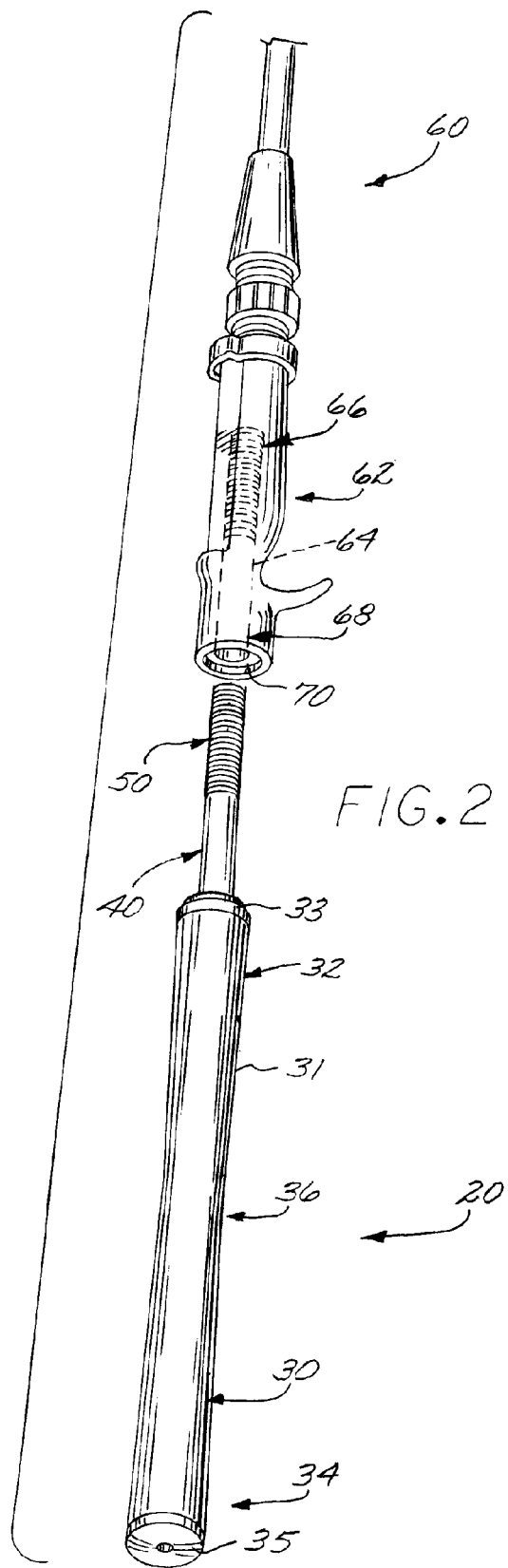

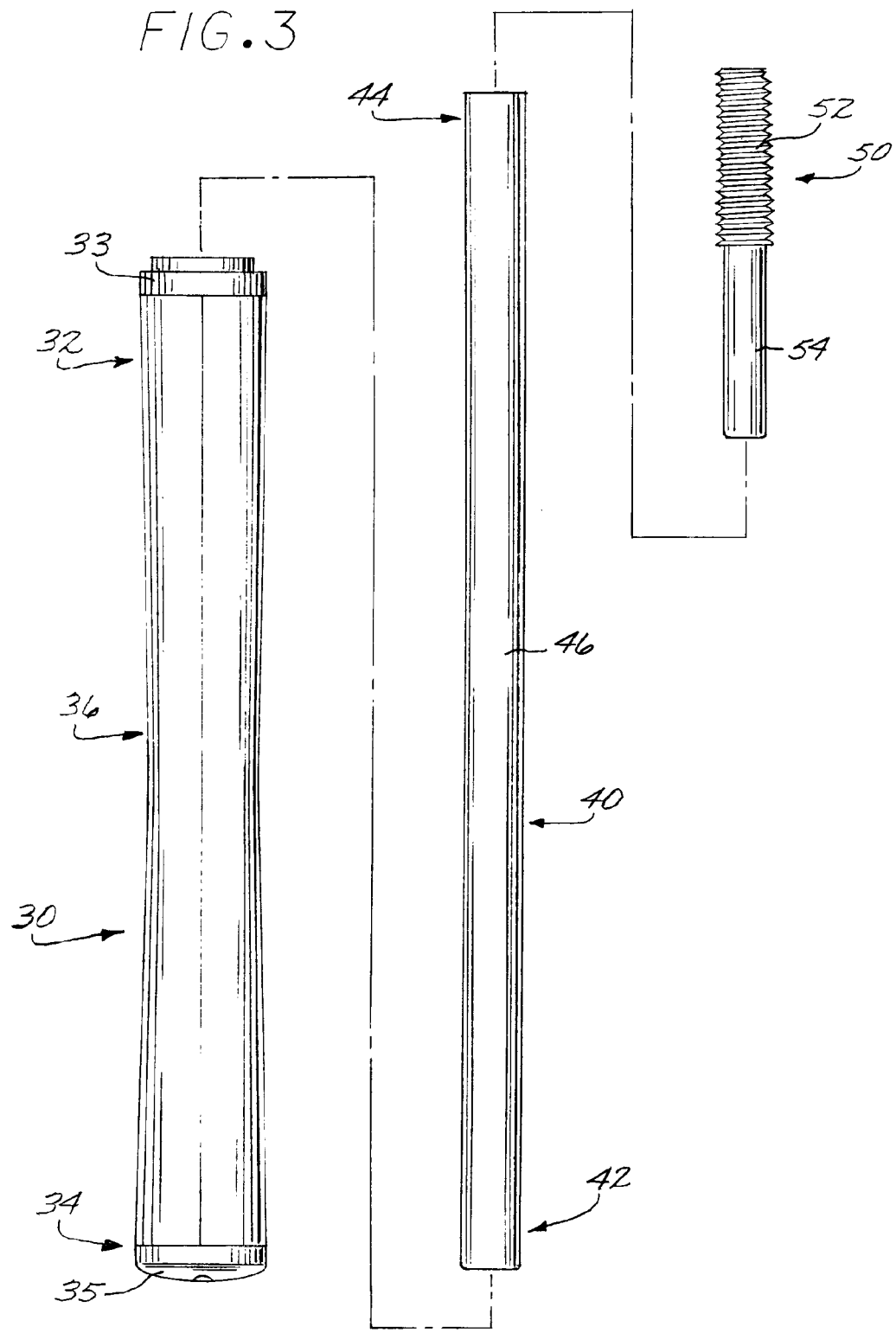

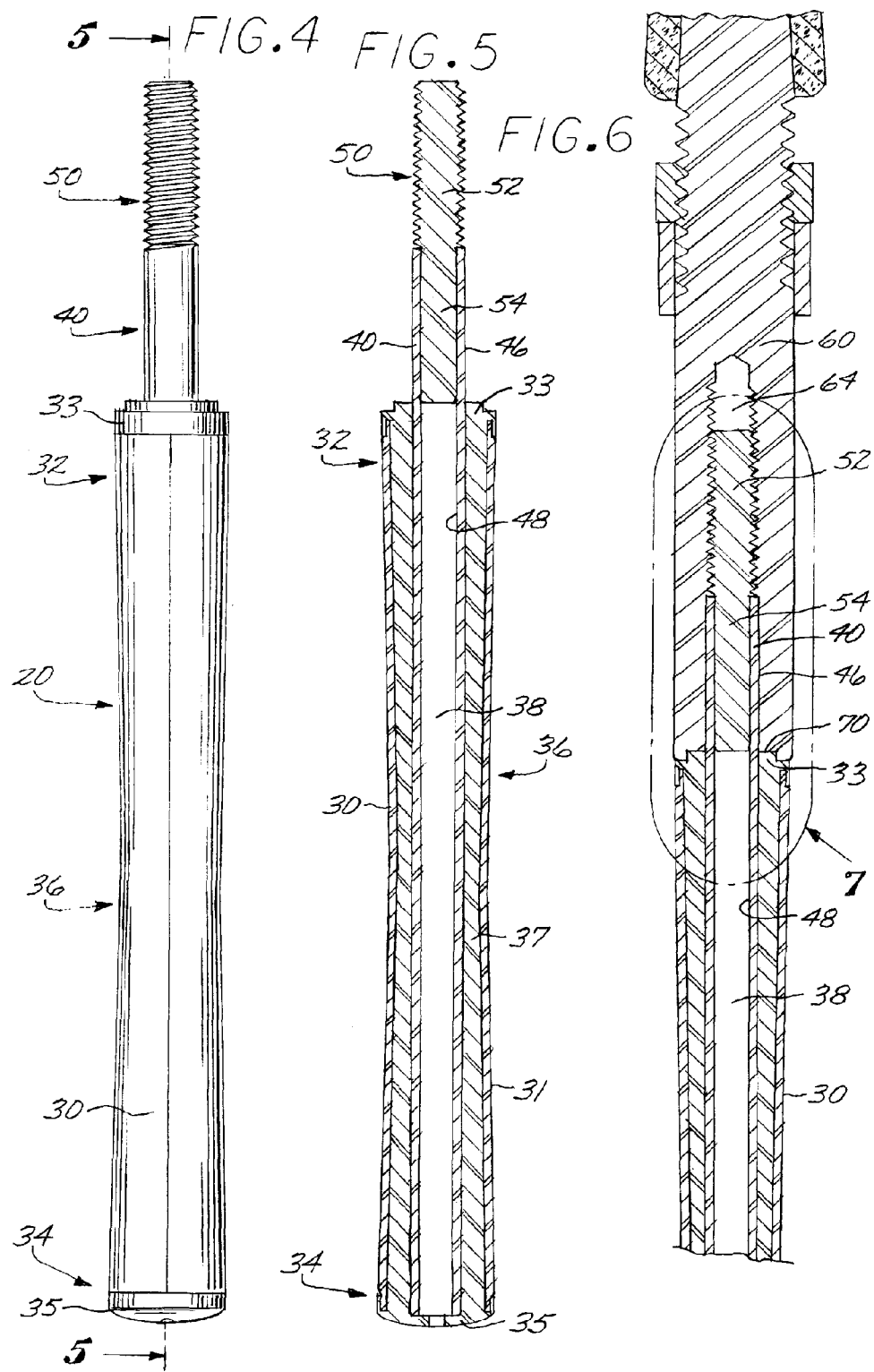

EXCHANGEABLE HANDLE FOR USE WITH A FISHING POLE

CROSS-REFERENCE TO RELATED APPLICATIONS

The present application claims the benefit of U.S. Provisional Patent Application No. 61/262,511, filed Nov. 18, 2009 (entitled "EXCHANGEABLE HANDLE FOR USE WITH A FISHING POLE"), the disclosure being hereby incorporated by reference in its entirety.

The present application hereby incorporates by reference in their entireties the following: U.S. Pat. No. 7,770,321, and U.S. application Ser. No. 12/753,773, which disclose embodiments of grips for use with fishing poles, the entirety of each being incorporated herein.

BACKGROUND OF THE INVENTION

1. Field of the Invention

Embodiments relate to articles having an exchangeable handle, particularly in the context of fishing poles.

2. Description of the Related Art

Though handles have been developed, there remains a need for an efficient way to exchange handles, particularly handles having a gripping portion.

SUMMARY OF THE INVENTION

An aspect of at least one of the embodiments disclosed herein includes the realization that the handles on articles can require exchange or replacement. Sometimes, the handles can have gripping portions that can become damaged or worn, often due to repeated use. In the context of fishing pole grips, the wet environments and the exposure to outdoor conditions can expedite the deterioration of the handle and grips.

Thus, in accordance with at least one of the embodiments disclosed herein, a handle can be configured for use with at least a portion of a fishing pole. The handle can comprise a grip portion comprising a cavity open to at least one end, the cavity extending longitudinally at least partially through the grip portion. A shaft can have a first end and a second end with the first end of the shaft at least partially inserted into an open end of the grip portion. Coupled to the second end of the shaft can be an adapter comprising a first coupling member. The adapter can be configured to be releasably attached to a second coupling member on a rod portion.

Some embodiments can include a handle comprising a grip portion, a shaft extending from the grip portion, and a first coupling member disposed on at least a portion of the shaft. The first coupling member can be configured to be releasably attached to a complimentary second coupling member disposed on an article.

In a method of using a fishing pole with an exchangeable handle, the method can comprise the steps of unbinding the exchangeable handle from the fishing pole and removing the exchangeable handle from the fishing pole. Once the exchangeable handle is removed, another exchangeable handle can be introduced to the fishing pole and bound to the fishing pole.

Embodiments can provide the ability to customize an article for different situations by easily exchanging a handle of the article. In the context of fishing pole, the handle can be exchanged for a handle with a gripping portion that is better suitable for a specific situation, such as to accommodate for different weather conditions, size and type of fish, or user's preferences.

BRIEF DESCRIPTION OF THE DRAWINGS

Further objects, features and advantages will become apparent from the following detailed description taken in conjunction with the accompanying figures showing illustrative embodiments, in which:

FIG. 1 is a perspective view of a fishing pole with a handle according to some embodiments.

FIG. 2 is an exploded perspective view of a fishing pole in FIG. 1 showing a configuration for coupling a handle with a rod portion, according to some embodiments.

FIG. 3 is an exploded side plan view of a handle of a fishing pole in FIG. 1 according to some embodiments.

FIG. 4 is a side plan view of an assembled handle of a fishing pole in FIG. 3 according to some embodiments.

FIG. 5 is a cross-sectional plan view of the assembled handle shown in FIG. 4 taken along line 5-5.

FIG. 6 is a cross-sectional plan view of the fishing pole with a handle shown in FIG. 1 taken along line 6-6.

Figure 7:
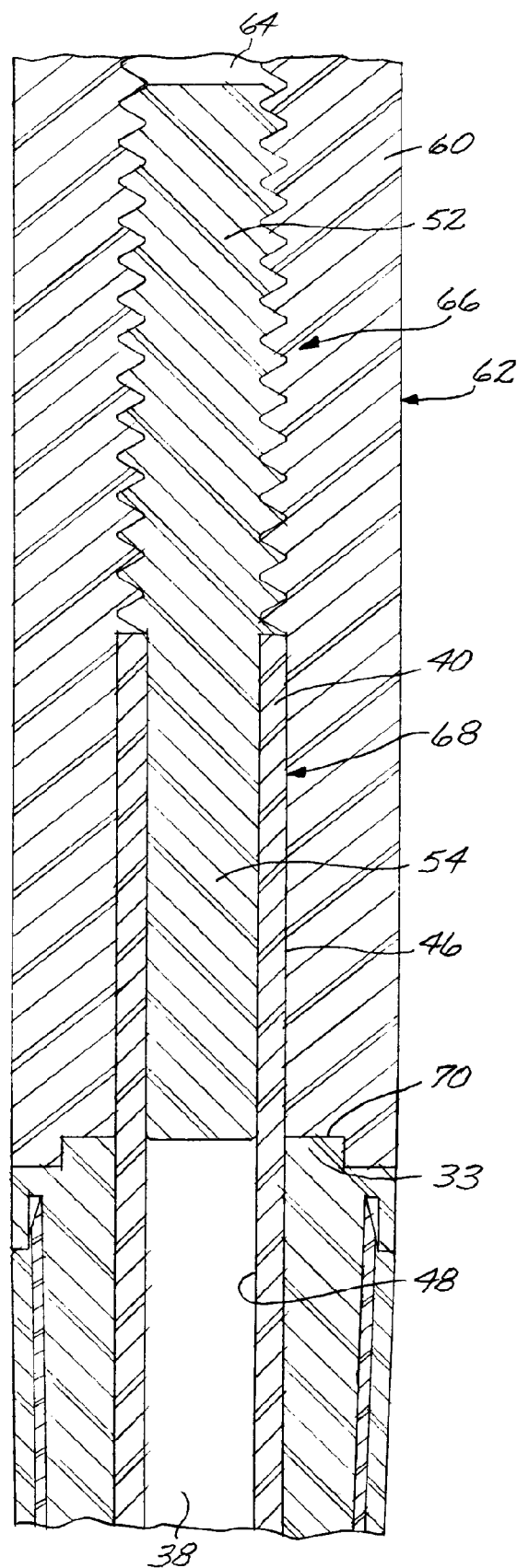
FIG. 7 is a close-up cross-sectional plan view of the fishing pole shown in FIG. 6, taken at detail 7.

While embodiments will now be described in detail with reference to the figures, it is intended that changes and modifications can be made to the described embodiments without departing from their true scope and spirit.

DETAILED DESCRIPTION OF THE PREFERRED EMBODIMENT

Articles having an exchangeable handle are described herein with particular reference to fishing poles. Such exchangeable handles can be especially advantageous for replacing worn or damaged grips easily and/or for customizing the fishing poles by exchanging the handles to suit a particular situation. Although described in the context of fishing poles, the exchangeable handles described herein can be applied to other articles such as golf clubs, tennis rackets and hand tools.

FIG. 1 is a perspective view of a fishing pole having a handle 20 and a rod portion 60 according to some embodiments. As illustrated in FIG. 2, the handle 20 can be disconnected from the rod portion 60, such that the handle 20 is interchangeable with other handles. In the illustrated embodiment, the handle 20 can be coupled to the rod portion 60 through a threaded connection, as described in further detail below. However, other types of connections are also contemplated.

As illustrated in the exploded assembly view of FIG. 3, the handle 20 can comprise a grip portion 30, a tubular shaft 40, and a threaded adapter 50. In the illustrated embodiment, the grip portion 30 is an elongate cylindrical member having a first end 32 and second end 34. Preferably, the portions towards the first end 32 and the second end 34 have a larger diameter than the middle portion 36 of the grip portion 30, such that the grip portion 30 has a generally hourglass shape. In some embodiments, middle portion 36 is disposed closer to the first end 32 than the second end 34. In some embodiments, middle portion 36 is disposed closer to the second end 34 than the first end 32. In some embodiments, the grip portion 30 can have substantially a constant diameter through its longitudinal length. In some embodiments, the grip portion 30 can have enlarged stop members (not illustrated) toward the first end 32 and/or second end 34 to help prevent the handle 20 from inadvertently releasing from the user's control. In some embodiments, the grip portion 30 can have a cross-section of any shape, such as for example triangular, square or hexagonal. Grip portions 30 having a shaped cross-section are advantageous for applying torque to the handle 20 about the longitudinal axis. In other embodiments, the grip portion 30 can have other configurations commonly known in the art for article grips.

In the illustrated embodiment, the length of the grip portion 30 is approximately 22 cm. In some embodiments, the grip portion 30 can range from about 9 cm to about 30 cm. In other embodiments, the grip portion 30 can be any desired length suitable for an application. The width or diameter of the grip portion 30 in the illustrated embodiment is about 2.4 cm at the middle portion 36 and about 2.5 at the first and second portions 42, 44. In other embodiments, the width of the grip portion 30 can be any dimension to allow gripping by a user.

In some embodiments, the grip portion 30 includes an inner body 37 (see, e.g. FIG. 5) and an outer gripping portion 31. In some embodiments, inner body 37 is made of one or more resilient materials, for example rubber and/or ethylene-vinyl-acetate (EVA). In other embodiments, the grip portion 30 can be made of other supporting materials, including metals, fiberglass, and composites. In some embodiments, outer gripping portion 31 can be made of one or more layers of material, including EVA, polyurethane, and/or felt. In some embodiments, grip portion 30 can be made of a substantially unitary piece, for example cork or EVA. In some embodiments, the outer gripping portion 31 can be made of other suitable materials, such as for example rubber, cork, plastics or composites.

The grip portion 30 can be covered with an outer gripping portion 31 that provides the desired shock transmission, tackiness, and torsion resistance required of a grip for a fishing pole. In some embodiments, the outer gripping portion 31 can be a sleeve that includes a cavity configured to receive at least a portion of the body 37 of the grip portion 30 of a fishing pole, rod, or other article. In the illustrated embodiment, the body 37 includes an opening at the first end 32 adapted to receive the tubular shaft 40 and a second end 34 including a substantially enclosed closed end.

In some embodiments the first end 32 of the grip portion 30 can include a nipple 33, which can be a stepped structure configured to accommodate a complimentary mating portion of the rod portion 60, as described in further detail below. Alternatively, in some embodiments the nipple 33 may be tapered to provide a smoother transition from the rod portion 60 or tubular shaft 40 to the grip portion 30. The nipple 33 can be integrally formed with the grip portion 30 or can be separately formed and later joined to the grip portion 30. As shown, in some embodiments, the nipple 33 can define a circumferential nipple ledge extending around the grip cavity 38. The nipple ledge may comprise a nipple contact surface and a nipple outer surface.

As shown, in some embodiments the second end 34 of the grip portion 30 can include a cap 35. The cap 35 may include an opening to facilitate the escape of air as a shaft is inserted into the grip portion 30. The cap 35 may define a generally convex shape on its end. In some embodiments, the cap defines a circumferential cap ledge extending around the grip portion 30. The cap ledge comprises a cap contact surface and a cap outer surface.

In the illustrated embodiment, the cap 35 and nipple 33 are integrally formed with the body 37 of grip portion 30. In some embodiments, the cap 35 and nipple 33 are made from the same material as the body 37 so as to seamlessly or virtually seamlessly blend in with the body. Alternatively, the cap 35 and nipple 33 can be a different material to facilitate the placement of material having different rigidity or other characteristics at the ends of the grip portion 30.

In some embodiments, the outer gripping portion 31 can be a panel that wraps around the body 37. In other embodiments, the outer gripping portion 31 can be a flat strip that can be spirally wrapped around the body 37. Preferably, the outer gripping portion 31 includes an adhesive tape layer to hold the wrap to the body 37. In some embodiments, the outer gripping portion 31 can have a textured surface to facilitate better gripping.

Additional disclosure of embodiments of grips for fishing poles can be found in United States Patent Application Publication No. 2008/0229646 A1 and U.S. Provisional Application No. 61/177,210, which are attached hereto.

The grip portion 30 can be configured to accept a tubular shaft 40, as illustrated in FIG. 5 and described in further detail below. In the illustrated embodiment, an elongate grip cavity 38 extends longitudinally through the middle of the grip portion 30 and is open at the first end 32. Preferably, the second end 34 is closed to provide a stop for the tubular shaft 40. In preferred embodiments, the elongate grip cavity 38 extends almost through the entire length of the grip portion 30. In the illustrated embodiment, the elongate grip cavity 38 is about 20 cm. In some embodiments, the elongate grip cavity 38 can extend through a partial length of the grip portion 30. In other embodiments, the elongate grip cavity 38 can be a through hole that extends the entire length of the grip portion 30.

With continued reference to FIG. 3, the tubular shaft 40 can be an elongate cylinder with a hollow core, such that the tubular shaft 40 has an annular cross-sectional area. The tubular shaft 40 can have a first portion 42 and a second portion 44 opposite the first portion 42. The first portion 42 is configured to couple with the grip cavity 38 of the grip portion 30. In preferred embodiments, the first portion 42 of the tubular shaft 40 has an outer surface 46 that is generally smooth and couples with a generally smooth surface of the grip cavity 38. In preferred embodiments, the tubular shaft 40 is made of a rigid and strong material, such as metals, rigid plastics, fiberglass, and/or composites. For example, the tubular shaft 40 can be made of Delrin®, which is rigid yet easily machineable.

In some embodiments, the tubular shaft 40 can be secured to the grip cavity 38 of the grip portion 30 with an adhesive commonly known in the art, but preferably waterproof adhesive. In embodiments where adhesive is used, the outer surface 46 of the tubular shaft 40 and/or the surface of the grip cavity 38 can include a textured surface to enhance the bonding of the adhesive to the surfaces.

In other embodiments, friction between the tubular shaft 40 and the grip cavity 38 can be sufficient to secure the two members together. For example, the outer diameter of the tubular shaft 40 can be slightly larger than the diameter of the grip cavity 38 such that an interference fit is created. At least one of the tubular shaft 40 or grip cavity 38 can include a material that provides high sliding friction, such as rubber.

In alternative embodiments, the tubular shaft 40 can be fastened to the grip cavity 38. In some embodiments, the tubular shaft 40 can include outer threads on the first portion 42 that are configured to cooperate with complimentary inner threads in the grip cavity 38 to secure the tubular shaft 40 to the grip portion 30. In some embodiments, the threads in grip cavity 38 can be disposed on an insert (not shown) that is positioned within the grip cavity 38. The insert can be used where the grip portion 30 material is not favorable for forming threads. The insert can advantageously be made of a stronger material, such as metal or rigid plastic, that can provide the desired structural rigidity to support thread coupling. Similarly, a threaded sleeve (not shown) can be provided on the tubular shaft 40.

In other embodiments, the grip portion 30 can include a threaded hole extending laterally from the exterior surface of the grip portion 30 to the cavity for accepting a set screw that can be engaged with the tubular shaft 40 to secure it inside the grip cavity 38. In still other embodiments, other means of securing the tubular shaft 40 to the grip portion 30 can be used, such as for example hooks or latches. In some embodiments, the tubular shaft 40 and grip portion 30 can be a unitary piece that are formed together. The tubular shaft 40 and grip portion 30 can be machined or molded from a single piece of material.

In the illustrated embodiment, the length of the tubular shaft 40 is approximately 27 cm. In some embodiments, the length can range from approximately 3 cm to approximately 30 cm. Preferably, the length of the tubular shaft 40 is at least as long as the length of the grip cavity 38 of the grip portion 30. The illustrated embodiment of the tubular shaft 40 has an outer surface 46 with a diameter of about 1.3 cm and an inner surface 48 with a diameter of about 0.8 cm. In some embodiments, the diameter of the outer surface 46 can range from approximately 1 cm to approximately 2 cm. In some embodiments, the diameter of the inner surface 48 can range from approximately 0.3 cm to approximately 1 cm.

With continued reference to FIG. 3, the threaded adapter 50 is an elongate member comprising a threaded portion 52 and a shaft portion 54. The shaft portion 54 is configured to couple with the inner surface 48 of the tubular shaft 40. In the illustrated embodiment, the shaft portion 54 has a generally smooth surface and can slide into the tubular shaft 40. In the illustrated embodiments, the shaft portion 54 has a diameter of approximately 0.8 cm. In some embodiments, the diameter of the shaft portion 54 can range from approximately 0.3 cm to approximately 1 cm. In other embodiments, the diameter of the shaft portion 54 can be any size to fit into the tubular shaft 40.

In some embodiments, the shaft portion 54 can be configured to resist rotational movement of the threaded adapter 50 within the tubular shaft 40. For example, the shaft portion 54 can include ridges that extend along its longitudinal length to resist rotation. In other embodiments, the shaft portion 54 can include a hexagonal shape, a notch or a textured surface to resist rotation. In the illustrated embodiment, the length of the shaft portion 54 is about 6 cm. In some embodiments, the length of the shaft portion 54 can range from approximately 1 cm to approximately 30 cm.

In the illustrated embodiment, the threaded portion 52 comprises outer threads that are configured to cooperate with complimentary threads on the rod portion 60, as described in further detail below. In the illustrated embodiment, the length of the threaded portion 52 is approximately 6 cm. However, the threaded portion 52 can range from approximately 1 cm to approximately 10 cm.

The threaded adapter 50 is preferably made of a rigid material that is favorable for thread formation. For example, the threaded adapter 50 can be made of a metal, composite, or rigid plastic, such as aluminum, Delrin®, or polyethylene. In other embodiments, the threaded adapter 50 can be made of any other material having sufficient strength to withstand the forces experienced by the handle 20.

The threaded adapter 50 and tubular shaft 40 can be coupled by any means, such as those described above for the coupling of the grip portion 30 and tubular shaft 40. For example, the coupling means can include adhesives, threaded connections, or set screws. In some embodiments, the threaded adapter 50 can be made as a unitary piece with the tubular shaft 40. The threaded adapter 50 and the tubular shaft 40 can be machined or molded into a single piece.

In some embodiments, the threaded adapter 50 can be a hollow sleeve with outer threads configured to fit around the outer surface 46 of the tubular shaft 40. In these embodiments, the tubular shaft 40 can have a reduced outer diameter along the second portion 44 where the hollow threaded adapter 50 is positioned to account for the additional diameter from the hollow threaded adapter 50.

FIGS. 4 and 5 illustrate an embodiment of an assembled handle 20. The tubular shaft 40 can be inserted into the grip portion 30 and secured together through any of the means described above. In some embodiments, for example when adhesives are incorporated, the outer surface 46 of the tubular shaft 40 and/or the grip cavity 38 of the grip portion 30 can be provided with a lubricant to assist assembly. Preferably, the lubricant will dry or will otherwise lose its lubricity after time for a more secure fit.

In the illustrated embodiment, the tubular shaft 40 is inserted into generally the entire length of the grip portion 30. In some embodiments, the length of the tubular shaft 40 is greater than the length of the grip portion 30, resulting in a portion of the tubular shaft 40 extending outside of the grip cavity 38, as illustrated in FIGS. 4 and 5. Though shown extending beyond the grip cavity 38, in some embodiments the tubular shaft 40 and the grip cavity 38 can be commensurate or approximately equal in length. In some embodiments the grip cavity 38 can extend beyond the tubular shaft 40. In the illustrated embodiment, the tubular shaft 40 extends about 6 cm outside of the grip cavity 38. In other embodiments, the tubular shaft 40 may extend less or more than 6 cm outside of the grip cavity 38. As described above, in some embodiments, the tubular shaft 40 may not extend outside of the grip cavity 38. In some embodiments, the tubular shaft 40 can be shorter in length than the length of the grip portion 30. However, the tubular shaft 40 can be inserted only partially into the length of the grip portion 30, wherein a portion of the tubular shaft 40 still extends outside of the grip cavity 38.

With continued reference to FIGS. 4 and 5, the threaded adapter 50 can be inserted into the second portion 44 of the tubular shaft 40 and coupled together by any of the means described above. In the illustrated embodiment, the threaded adapter 50 is inserted about 6 cm into the tubular shaft 40. In other embodiments, the threaded adapter 50 can be inserted more or less than 6 cm into the tubular shaft 40.

With reference to FIGS. 2 and 6, the rod portion 60 can include a connector portion 62 having a connector cavity 64. The connector cavity 64 can have features complimentary to the assembled handle 20 for releasably securing the handle to the rod portion 60. In the illustrated embodiment, the connector cavity 64 is an elongate aperture with inner threads disposed along the distal portion 66 of the connector cavity 64 that are complimentary to the outer threads on the handle 20. The rod portion 60 can also comprise a depression 70 at the proximal end 68 of the connector cavity 64 that is configured to mate with the nipple 33 on the grip portion 30.

As illustrated in FIG. 7, the tubular shaft 40 and the threaded adapter 50 of the handle 20 can be inserted into the connector cavity 64 until the outer threads on the handle 20 engage the inner threads in the connector cavity 64. As the connection is tightened, the handle 20 is drawn toward the rod portion 60. Preferably, the threaded portion 52 of the threaded adapter 50 is longer than the length of the inner threads of the connector cavity 64 so that the handle can be inserted sufficiently into the rod portion 60 to form a tight junction between the depression 70 and the nipple 33, as illustrated in FIG. 7. In some embodiments, the tubular shaft 40 can mate with the inner walls of the connector cavity through a interference or tight fit to provide additional rigidity to the assembly.

Although described with reference to a threaded connection between the handle 20 and rod portion 60, other connection means are also contemplated. In alternate embodiments, the coupling between the handle 20 and the rod portion 60 can include any connection means that provides a rigid, yet releasable attachment. For example, the coupling can include latches, hooks, or quarter-turn connections.

Although certain embodiments, features, and examples have been described herein, it will be understood by those skilled in the art that many aspects of the methods and devices illustrated and described in the present disclosure may be differently combined and/or modified to form still further embodiments. For example, any one component of the exchangeable handle and gripping portion illustrated and described above can be used alone or with other components. Additionally, it will be recognized that the methods described herein may be practiced in different sequences, and/or with additional devices as desired. Such alternative embodiments and/or uses of the methods and devices described above and obvious modifications and equivalents thereof are intended to be included. Thus, it is intended that the scope of this disclosure should not be limited by the particular embodiments described above.

What is claimed is:

1. A handle assembly, comprising a handle and a fishing pole, the fishing pole comprising:
   a connector portion defining a connector cavity having an open end and a terminal distal end opposite the open end, the connector cavity defining connector threads and a non-threaded internal surface between the connector threads and the open end;

the handle comprising:
a grip portion comprising an inner wall defining a grip cavity open to at least one end, the grip cavity extending longitudinally through substantially the entire length of the grip portion;
   a shaft having a first end and a second end, wherein a first portion of the shaft extends through substantially the entire length of the grip cavity of the grip portion and having a second portion which extends beyond the at least one end of the grip portion, said first portion defining a first outer surface and the second portion defining a second outer surface, said inner wall of the grip portion and the outer surface contacting one another through substantially the entire length of the grip cavity;
   an adapter coupled to the second portion of the shaft, the adapter comprising adaptor threads at a distal end opposite the shaft;
   wherein the adapter is in direct contact with the connector portion of the fishing pole such that said connector threads of the fishing pole and said adaptor threads of the handle engage one another, and said non-threaded internal surface of the connector portion and the first outer surface of the shaft directly contact each other to form a tight fit.

2. The handle assembly according to claim 1, wherein the shaft is hollow.

3. The handle assembly according to claim 2, wherein the adapter further comprises a shaft portion that is configured to be inserted into the second end of the hollow shaft.

4. The handle assembly according to claim 1, wherein the adaptor comprises outer threads and the connector portion of the fishing pole comprises complimentary inner threads.

5. The handle assembly according to claim 1, wherein the grip portion further comprises an inner body and an outer gripping portion.

6. The handle assembly according to claim 5, wherein the inner body comprises ethylene vinyl acetate.

7. The handle assembly according to claim 5, wherein the inner body comprises rubber.

8. The handle assembly according to claim 5, wherein at least a portion of the outer gripping portion is textured.

9. The handle assembly according to claim 1, wherein the grip portion is generally hourglass shaped.

10. The handle assembly according to claim 1, wherein the grip portion comprises cork.

11. The handle assembly according to claim 1, wherein the shaft and adapter are made as a unitary piece.

12. The handle assembly according to claim 1, wherein the non-threaded internal surface smooth.

\* \* \* \* \*